Sept. 15, 1964 R. T. LAWRENCE 3,148,722
APPARATUS FOR WINDING HELICAL WAVEGUIDES
Filed Sept. 7, 1961
2 Sheets-Sheet 1
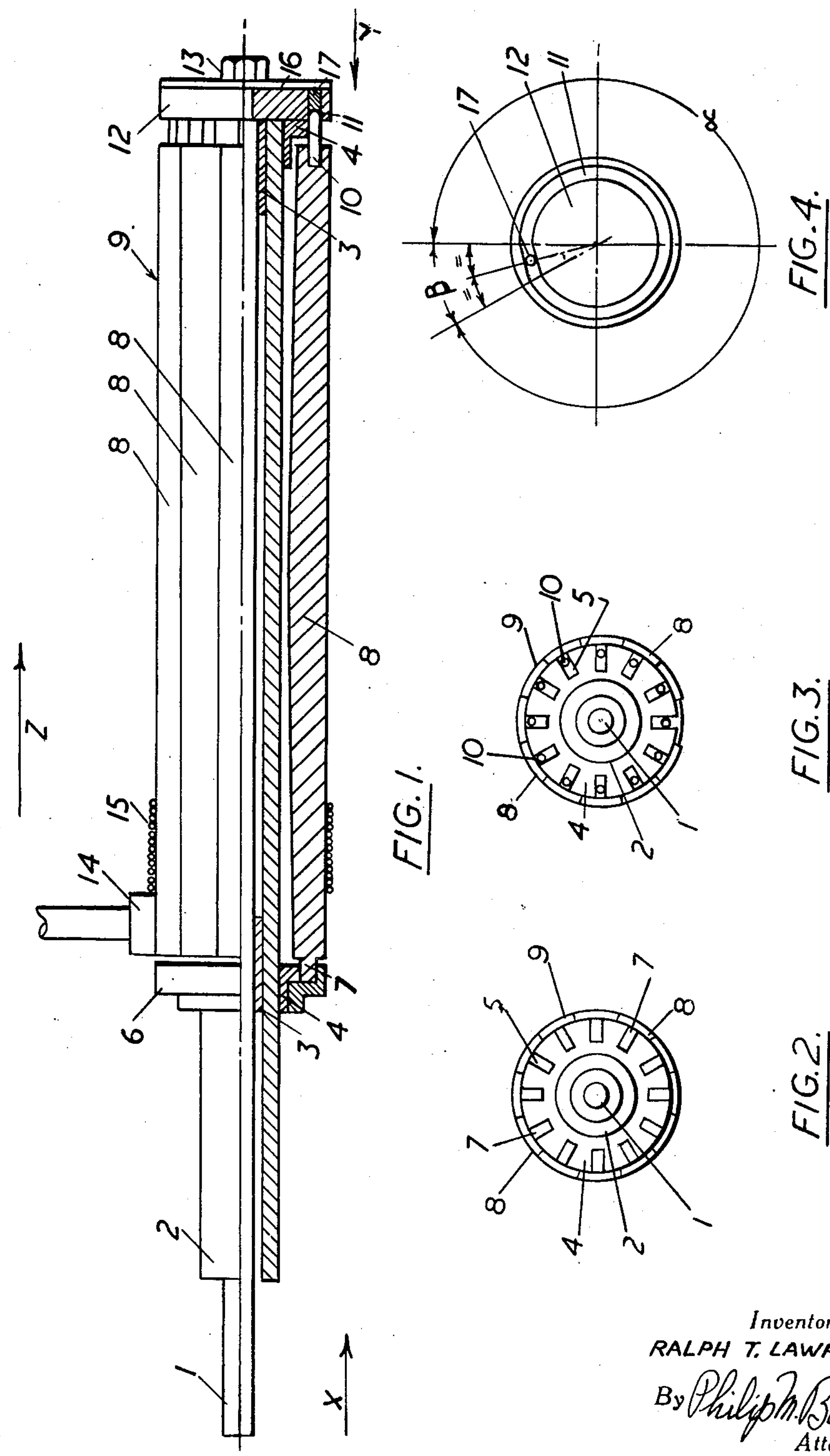
Inventor
RALPH T. LAWRENCE
By Philip M. Bolton
Attorney

APPARATUS FOR WINDING HELICAL WAVEGUIDES

Filed Sept. 7, 1961

Inventor
RALPH T. LAWRENCE
By Philip M. Bolton
Attorney 3,148,722
Patented Sept. 15, 1964

3,148,722

APPARATUS FOR WINDING HELICAL WAVEGUIDES

Ralph Thomas Lawrence, London, England, assignor to International Standard Electric Corporation, New York, N.Y., a corporation of Delaware Filed Sept. 7, 1961, Ser. No. 136,641
Claims priority, application Great Britain Sept. 13, 1960
6 Claims. (Cl. 153—67)

This invention relates to an apparatus for the continuous manufacture of circular waveguides.

British Patent No. 780,503 (Lewin-Karbowiak) dedescribes a construction in which a waveguide is formed as a helix of fine wire wound with the successive turns in peripheral contact, the axis of the helix being the longitudinal axis of the waveguide. One method of manufacturing this type of waveguide is to wind a wire of suitable diameter onto the end of a mandrel to form a continuous helix having closed coils, the turns of which move along and finally off the mandrel as fresh wire is added at the winding on end. During the passage of the helix along the mandrel the closed coils may be treated in various ways to lock the closed coils together and to provide external protection. To ensure that a distortion free waveguide is produced by this method it is necessary for the mandrel to support the closed coils until they are locked together. It is also preferable to carry out any other treatment upon the closed helix while it is supported by the mandrel in order to reduce the risk of damage to the closed helix.

The actual time that the closed coils are supported by the mandrel depends upon the velocity at which the closed coils move along the mandrel and the length of the mandrel. In order to avoid excessive friction between the closed coils and the mandrel surface it has been found necessary to limit the length of the mandrel and so an undesirable limitation has been imposed upon the velocity of the closed coils along the mandrel, this has limited the rate at which a satisfactory waveguide may be produced.

It is the object of the present invention to provide an apparatus for the manufacture of waveguides of wire or the like wound in closed coils and which overcomes the above disadvantage.

According to the present invention in an apparatus for manufacturing a waveguide by winding wire or the like about a mandrel the mandrel has an external surface composed of a plurality of longitudinally reciprocating members.

According to a further feature of the present invention the said longitudinally reciprocating members have at least the ends which are removed from the winding-on position of the said wire or the like moved towards the centre of the mandrel when reciprocating in the reverse direction to the movement of the closed coils.

Referring now to the drawing which illustrates two embodiments of the present invention—

FIG. 1 is a side elevation, the lower half of which is sectioned about the centre line passing through the cam pin 17 of an embodiment of the present invention.

FIG. 2 is an end elevation in the direction of arrow X of the embodiment shown in FIG. 1 with the end cap 6 removed.

FIG. 3 is an end elevation in the direction of arrow Y of the embodiment shown in FIG. 1 with the cam plate 12 removed.

FIG. 4 is an end elevation of the cam 12 in the direction of arrow X.

Figure 5:
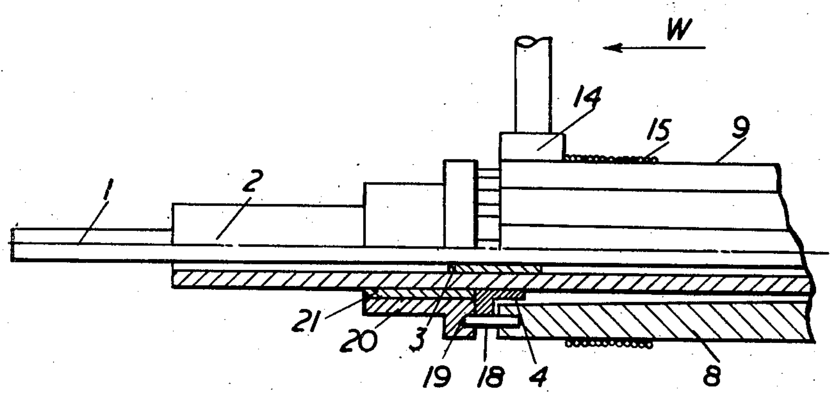
FIG. 5 is a part side elevation of another embodiment, of the present invention sectioned in the same manner as FIG. 1.

Referring to the embodiment shown in FIGS. 1, 2, 3 and 4, a fixed shaft 1 has a rotatable hollow shaft 2 coaxial therewith and spaced therefrom by bushes 3. The fixed shaft 1 is held stationary by suitable means while the rotatable shaft 2 is supported in bearings and rotated by suitable driving means. Keyed to the hollow shaft 2 are driving plates 4 provided with radial slots 5. The left hand driving plate 4 (FIG. 1) is enclosed in an end cap 6, which is secured by set screws (not shown) to the driving plate 4. Fitted in the radial slots 5 of this driving plate are ends 7 of reciprocating members 8. Twelve reciprocating members 8 are assembled in this way to provide a cylindrical outer surface 9. The right hand ends of the reciprocating members 8 (FIG. 1) have pins 10 secured therein. The pins 10 pass through the radial slots 5 of the right hand driving plate 4 and the ends are enclosed in a cam path 11 in the cam plate 12. The cam plate 12 is secured to the end of the fixed shaft 1 by a bolt 13 and cover plate 16. A cam pin 17 which protrudes into the cam path 11 is retained in the cam plate 12 by the cover plate 16. The portion of the cam pin 17 which protrudes into the cam path 11 has sloping sides to form a chisel point which spans the width of the cam path 11. As shown in FIG. 4 the cam path 11 is for the most part circular and coaxial with the axis of the rotation of the assembly, the remaining portion of the cam path 11 being straight and having the cam pin 17 located at the centre of the straight portion. A fleeting roller 14 capable of adjustment along the vertical centreline of the assembly and a number of turns of wire 15 are shown.

In operation the exposed portion of the fixed shaft 1 is secured in a suitable fixed clamp. The exposed portion of the rotatable hollow shaft 2 is secured in supporting bearings and it is coupled to a suitable driving means which will rotate it. A few turns of the wire 15 are wound round the left-hand end of the cylindrical surface 9 and then the fleeting roller 14 is adjusted to press against the side of the last turn of the wire 15. The hollow shaft 2 is then caused to rotate, which in turn rotates the reciprocating members 8 by plates 4 and winds more wire 15 from a braked supply reel (not shown) on to the cylindrical surface 9. The fleeting roller 14 will cause the wire 15 to be fed on to the cylindrical surface 9 in one position and as the freshly applied wire 15 is tensioned by the braked supply reel the freshly applied wire 15 will cause the turns that have been applied before to be pushed along the cylindrical surface 9 in the direction of arrow Z.

The cam plate 12 which is stationary has the pins 10 on the reciprocating member 8 moving round the cam path 11. The end cap 6 is secured to the rotating hollow shaft 2 and so this assembly merely retains the left hand ends of the reciprocating members 8 in such a manner that an outer cylindrical surface 9 is provided for winding on the wire 15.

While the pin 10 are travelling round hte cam path 11 the turns of the wire 15 are urging the reciprocating members 8 in the direction of the arrow Z (FIGURE 1) and the cam path 11 is of sufficient depth to allow the reciprocating members 8 to move in this manner. When the pins 10 meet the cam pin 17 they are pushed partly out of the cam path 11 by the chisel point which is arranged to return the reciprocating members 8 to the position that they occupied before being moved by the turns of the wire 15. While the pins 10 are passing round the arc $\alpha$ of the cam path 11 the reciprocating members 8 provide a cylindrical outer surface 9 but when a pin 10 travels along the straight portion of the cam path 11, for arc B, the reciprocating member to which the pin 10 is attached has its right hand end tilted towards the axis of rotation.

The cam pin 17 is located at the position where a reciprocating member 8 is tilted the maximum amount and so when a reciprocating member is tilted the maximum amount it is also pushed to the left (FIG. 1) a distance equal to the distance it has been displaced by the coils and so no rubbing takes place between the reciprocating members 8 and the wire 15. The inward and return movement of the reciprocating members 8 is preferably not more than the arc occupied by one reciprocating member 8 in order that only one reciprocating member 8 will be moving in this manner at any time. In the embodiment shown twelve reciprocating members are used and so it is preferable that angle $\beta$ be 30° or less. It is essential to provide a small gap between each of the reciprocating members 8 to allow them to move towards the axis of rotation relative to each other.

If desired the reciprocating members 8 may be displaced towards the axis of rotation at both ends so that the external surface of reciprocating members are always parallel to the axis of rotation. We prefer, however, to tilt the reciprocating members 8 in the manner disclosed in the above embodiment because there is less inward displacement of the reciprocating members 8 at the position where the wire 15 is wound on to the cylindrical surface 9 and so a more circular cross-section of the wound wire is obtained.

Figure 6:
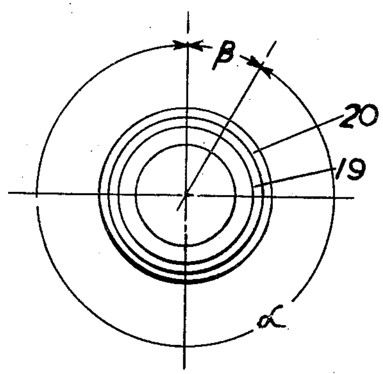
FIG. 6 is an end elevational view of cam 20 in the direction of arrow W.

Referring now to the embodiment shown in FIGS. 5 and 6, in which like numerals represent the same parts as in FIGS. 1 to 4, the reciprocating members 8 are provided with pins 18 in the left hand ends. It is to be understood that the right hand portion of this embodiment (which is not shown) is the same as the embodiment shown in FIGS. 1 to 4. The pins 18 run along a cam path 19 in cam plate 20. The cam plate 20 is supported by bushing 21 on the rotating hollow shaft 2. The driving plate 4, which is keyed to the hollow shaft 2 is assembled in the reverse direction to that shown in FIG. 1 in order not to obstruct the cam plate 20. The cam path 19 is circular (see FIG. 6) so that the left hand ends of the reciprocating members 8 provide an outer cylindrical surface 9. The inner surface of the cam path 19 against which the pins 18 press is shaped for the angle $\alpha$° to correspond to the helical path taken by $$\frac{\alpha}{360}$$

of a turn of the wire 15. The remaining portion $\beta$° of the cam path 19 is recessed to allow the reciprocating members 8 to be pushed back by the cam pin 17 (FIGS. 1 and 4).

In operation this embodiment is operated in the same manner as the embodiments shown in FIGS. 1 to 4 except that the cam plate 20 is clamped so that it is held stationary whilst the rotating shaft 2 rotates inside it. Since the driving plate 4 is keyed to the rotating shaft 2 the driving plate 4 will push the pins 18 round the cam path 19. The pins 18 will follow the contour of the inner surface of the cam path 19 as long as it urges them to the right in FIG. 5 and since this contour for angle $\alpha$ is the same as that portion of the path of turn of the wire 15, then the reciprocating members will be urged for the angle $\alpha$ in the same path as the wire turns 15 take along the cylindrical surface 9 as they are displaced by the fleeting roller 14. The remaining portion $\beta$ of the cam path 19, which is deeper, is aligned with the portion $\beta$ of cam path 11 (FIG. 4) and so when cam path 11 as has previously been explained pushes the reciprocating members 8 back in a left hand direction (FIG. 5) the bottom surface of the cam path 19 is at a sufficient depth to allow this return motion.

During the passage of the coils of wire 15 along the cylinder 9 a binding agent may be applied to the coils to cause the coils to adhere. The binding agent may be of any known type for example, a binding agent in solution that requires the evaporation of a solvent carrier, or alternatively it may be a thermoplastic or thermosetting substance or an epoxy resin mixture. We have found that epoxy resin mixtures which may either be cold cured or heat cured are suitable as binding agents. Where a thermoplastic binding agent is used the cooling time for the heated and bonded coils may be reduced by any known cooling means, for example, by air or water cooling.

Plastic materials for example high or low density type polythene may be applied in any known manner to the coils of wire 15 as a binding agent. Alternatively the wire 15 may be coated with a plastic material before it is coiled on to the cylindrical surface 9 and then the coils 15 may be heated to bond the plastic coatings together.

The wire coils 15 may be metal or alloy sprayed, preferably with a metal which is capable of being metal sprayed at a relatively low temperature, to give bonding together of the turns of wire 15 and to impart mechanical strength.

In addition the coils of wire 15 may also be served with cotton tapes, steel armouring or resin bonded fibre glass whilst the coils are supported by the mandrel.

The cam paths used to reciprocate the reciprocating members 18 in the embodiments may be replaced by any other known means which will impart the desired reciprocating motion, for example, the reciprocating motion may be caused mechanically, electro-mechanically, electro-magnetically, pneumatically or hydraulically.

It is to be understood that the foregoing description of specific examples of this invention is not to be considered as a limitation on its scope.

What I claim is:

1. Apparatus for manufacturing a waveguide of helical coils of wire or the like comprising:
   (*a*) a plurality of longitudinal members;
   (*b*) means for rotating said longitudinal members about a fixed axis to form a rotating mandrel;
   (*c*) means for feeding the wire or the like onto the rotating mandrel at a first position along said axis;
   (*d*) means for guiding the fed wire to form helical coils on said rotating mandrel;
   (*e*) means for moving the formed coils together with a number of said longitudinal members in a given direction from said first position to a second position; and
   (*f*) means for moving a number of said rotating longitudinal members less than the total in the opposite direction from said second position to said first position.

2. Apparatus for manufacturing a waveguide of helical coils of wire or the like comprising:
   (*a*) a plurality of longitudinal members;
   (*b*) means for rotating said longitudinal members about a fixed axis to form a rotating mandrel;
   (*c*) means for feeding wire or the like to the rotating mandrel at a first position;
   (*d*) means for guiding the fed wire onto the mandrel so that helical coils are formed on the mandrel which move from said first position to a second position whereby said formed coils move said longitudinal members from said first toward said second position; and
   (*e*) means for moving a number of said longitudinal members less than the total at a time from said second position to said first position.

3. Apparatus according to claim 2 further comprising disengaging means for moving said longitudinal members out of contact with said coils of wire while the longitudinal members move from said second to said first position.

4. Apparatus according to claim 3 wherein said disengaging means comprises means for tilting said longitudinal members toward the axis of said mandrel.

5. Apparatus according to claim 3 wherein said disengaging means comprises means for displacing said longitudinal members toward the axis of said mandrel.

6. Apparatus for manufacturing a waveguide of helical coils of wire or the like comprising:

(*a*) a plurality of longitudinal members;

(*b*) means for rotating said longitudinal members around a fixed axis to form a rotating mandrel;

(*c*) means for feeding wire or the like to the rotating mandrel at a first position;

(*d*) means for moving said longitudinal members from said first position to a second position;

(*e*) means for guiding the fed wire onto the mandrel so that helical coils are formed which move together with said longitudinal members from said first position to said second position; and (*f*) means for moving a number of said longitudinal members less than the total at a time from said second position to said first position.

References Cited in the file of this patent

UNITED STATES PATENTS

| | | |
|---|---|---|
| 263,682 | Chaplin | Sept. 5, 1882 |
| 1,812,805 | Riley | June 30, 1931 |
| 2,338,933 | Graver | Jan. 11, 1944 |
| 2,783,816 | Wolf | Mar. 5, 1957 |
| 2,841,201 | Cheatle | July 1, 1958 |
| 2,868,268 | Lewis et al. | Jan. 13, 1959 |

FOREIGN PATENTS

| | | |
|---|---|---|
| 321,698 | Germany | June 11, 1920 |